W. PELTIER.
ROAD DRAG.
APPLICATION FILED APR. 15, 1916.

1,197,948.

Patented Sept. 12, 1916.
2 SHEETS—SHEET 1.

Witnesses

W. Peltier  Inventor
by  Attorneys

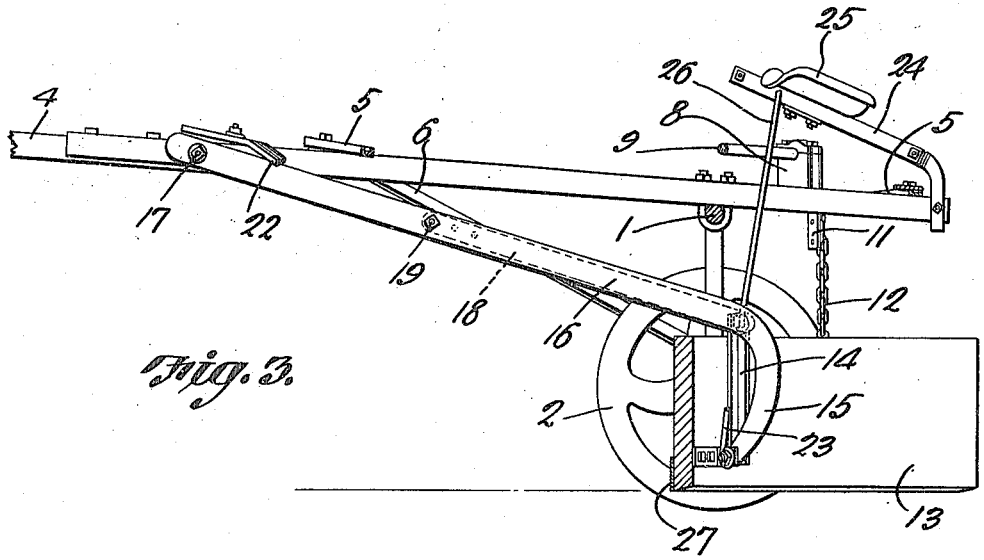
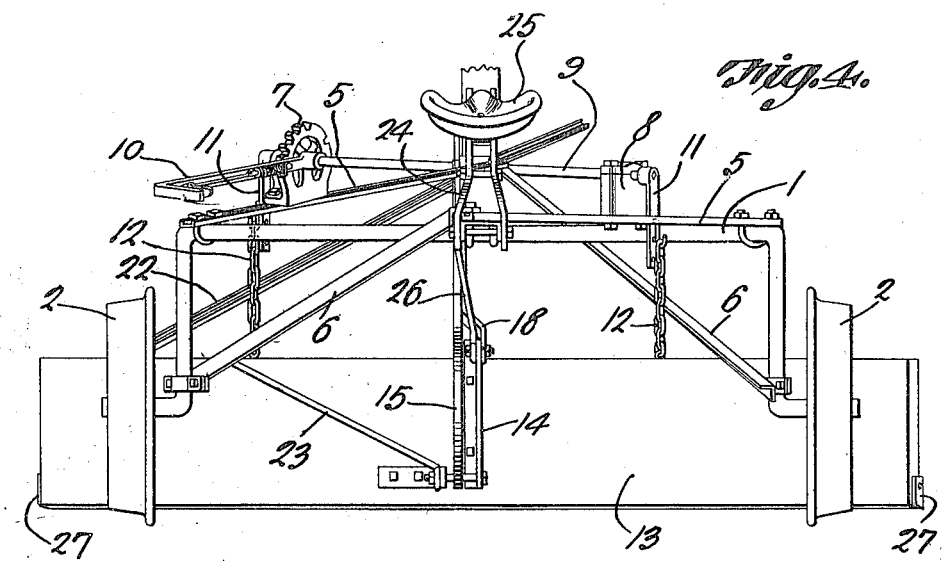

UNITED STATES PATENT OFFICE.

WILFRID PELTIER, OF CONCORDIA, KANSAS.

ROAD-DRAG.

1,197,948. Specification of Letters Patent. Patented Sept. 12, 1916.

Application filed April 15, 1916. Serial No. 91,432.

*To all whom it may concern:*

Be it known that I, WILFRID PELTIER, a citizen of the United States, residing at Concordia, in the county of Cloud and State of Kansas, have invented a new and useful Road-Drag, of which the following is a specification.

This invention relates to road drags, one object being to provide a scraping blade having its middle portion in line with the axis of the supporting wheels so that the blade will project equal distances forwardly and rearwardly from the axle, thereby equalizing the side strains and transmitting the thrusts directly to the wheels and also relieving the tongue of the weight of the blade.

A further object is to provide a shifting seat to be occupied by the driver and which can be moved to position so as to apply all or part of the weight of the driver directly to the scraping blade.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
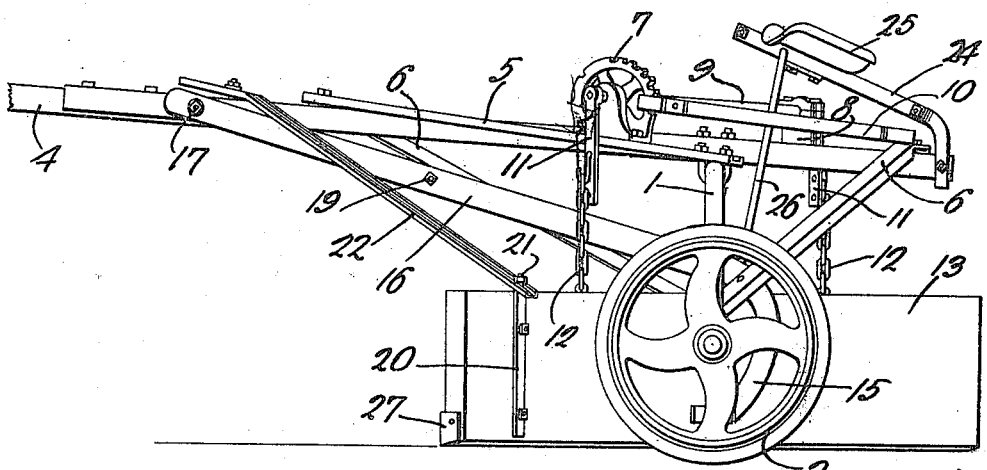
Figure 2:
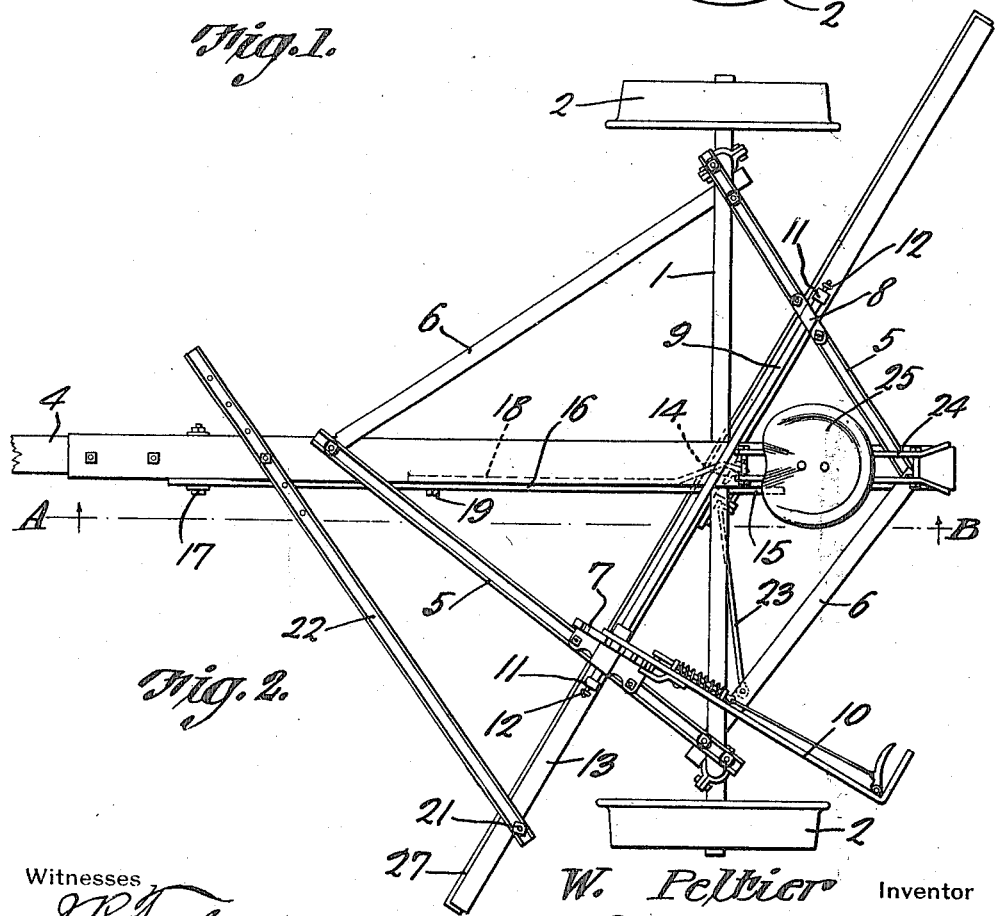

In said drawings:—Figure 1 is a side elevation of the road drag. Fig. 2 is a plan view thereof. Fig. 3 is a vertical longitudinal section on line A—B Fig. 2. Fig. 4 is a rear elevation.

Referring to the figures by characters of reference 1 designates an arched axle engaging supporting wheels 2 and having a draft beam 4 secured thereto and extending forwardly therefrom, there being braces 5 which connect the beam 4 to the axle at points close to the wheels 2. Additional braces 6 connect the beam to the end portions of the axle 1, it being understood that the braces 5 are attached to the axle above the bends therein while the braces 6 are attached to the axle close to the spindles or at the lower bends. It is to be understood of course that any other desired arrangement of braces may be provided.

Secured upon one of the braces 5 is a toothed segment 7 and secured to the other brace 5 is a bracket 8. Journaled within the segment 7 and the bracket 8 is a diagonal shaft 9 to which is secured a lever 10 provided with any suitable means for locking it to the segment so as to hold the shaft against rotation. Crank arms 11 extend from the end portions of the shaft 9 and are connected by chains 12 to a diagonally disposed scraping blade 13 extending under the arched portion of the axle. The middle portion of this scraping blade is located directly under the axle and secured to the center of the back face of the scraping blade is an angle strip 14 or the like to which is pivotally connected the downwardly and forwardly curved rear end portion 15 of a draw beam 16 which is pivotally connected to beam 4 as indicated at 17. An adjusting strip 18 is pivotally connected to the upper end of the angle strip 14 and is adjustably and pivotally attached to the beam 16, as indicated at 19. Thus it will be seen that by adjusting the strip 18 longitudinally the blade 13 can be tilted relative to the beam 16 so as to be held at any desired angle to the surface of the ground. A reinforcing strip 20 is secured to the back of the blade 13 near one end and has a stud 21 projecting upwardly therefrom and engaging a brace 22 which is secured at its front end to the beam 4. A brace rod 23 is attached to the rear brace 6 and to the lower end of the rear portion 15 of beam 16. Pivotally connected to the rear portion of the beam 4 is a frame 24 made up of spaced strips. Slidably mounted on these strips is a seat 25 and pivotally connected to the front end portion of the frame 24 is a thrust rod 26 which extends downwardly and is pivotally attached to the upper portion of the angle strip or bracket 14.

It is to be understood that the blade 13 may have its front face reinforced with a wear plate 27 extending along the lower edge portion thereof.

When the blade 13 is not in use it can be held out of contact with the ground by shifting lever 10 so as to pull upwardly through arms 11 and chains 12 upon the blade and by then locking the lever against movement. When the blade is to be used it is lowered into contact with the ground. When the driver desires to increase the pressure upon the blade he slides the seat 25 forwardly so that practically the entire weight of the driver will thus be transmitted through the rod 26 and upon the blade. By sliding the seat backwardly the blade will be relieved of the greater portion of the weight of the driver.

By means of the brace 22 the blade can be adjusted angularly about a vertical axis and held in any position to which it may be moved. By means of the strip 19 angular adjustment of the blade about a transverse axis is possible.

What is claimed is:—

1. A road drag including a wheel supported axle, a draft beam fixedly connected thereto, an obliquely disposed scraping blade extending under the axle, the middle portion of said blade being disposed in line with the axis of rotation of the supporting wheels, a draw beam extending from said draft beam and having a downwardly extended portion pivotally connected to the middle portion of the blade, and means connected to said blade and beam for adjusting the blade angularly about an axis extending longitudinally thereof.

2. A road drag including a wheel supported axle, a draft beam fixedly connected thereto, an obliquely disposed scraping blade extending under the axle and having its middle portion in line with the axis of rotation of the wheels, a brace connecting one end portion of the blade to the draft beam, a draw beam extending downwardly and rearwardly from the draft beam and pivotally connected to the back portion of the blade, an adjustable connection between the upper portion of the blade and said draw beam.

3. A road drag including a wheel supported axle, a draft beam fixedly connected thereto, an obliquely disposed scraping blade extending under the axle and having its middle portion in line with the axis of rotation of the wheels, a brace connecting one end portion of the blade to the draft beam, a draw beam extending downwardly and rearwardly from the draft beam and pivotally connected to the back portion of the blade, an adjustable connection between the upper portion of the blade and said draw beam, and means for raising and lowering the blade relative to the axle.

4. A road drag including a wheel supported axle, a draft beam fixedly connected thereto, an obliquely disposed scraping blade extending under the axle, the middle portion of said blade being disposed in line with the axis of rotation of the supporting wheels, a draw beam extending from said draft beam and having a downwardly extended portion pivotally connected to the middle portion of the blade, means connected to said blade and beam for adjusting the blade angularly about an axis extending longitudinally thereof, a seat support movable upwardly and downwardly, a push member connecting said support to the blade, and a seat slidably mounted on the support.

In testimony that I claim the foregoing as my own, I have hereto affixed my signature in the presence of two witnesses.

WILFRID PELTIER.

Witnesses:
  OLIN HUNTER,
  FLAVIA MAILHIOT.

Copies of this patent may be obtained for five cents each, by addressing the "Commissioner of Patents, Washington, D. C."